W. Burkhardt
& R. Reinecke
Inventors

Patented May 9, 1939

2,157,478

UNITED STATES PATENT OFFICE 2,157,478

METHOD OF COATING ARTICLES BY VAPORIZED COATING MATERIALS

Wilhelm Burkhardt, Berlin-Grunewald, and Rudolf Reinecke, Berlin-Lankwitz, Germany, assignors to Bernhard Berghaus, Berlin-Lankwitz, Germany Application June 15, 1937, Serial No. 148,384
In Germany June 17, 1936

7 Claims. (Cl. 91—70.1)

It is known to vaporize metals by heating and to coat therewith articles at sub-atmospheric pressure, which articles are so arranged that the metal vapour condenses on their surface. The metal vapor also condenses on the inner walls of the atomizing vessel and on the apparatus. It has, therefore, been proposed to cool the article which is to be coated, in order to increase the speed of condensation on the surface thereof as compared with the walls of the vessel. It is further known to provide a counter-electrode opposite the melt, which, acting on the metal vapour, will produce a special adherence of the condensate to the surface to be coated. Such action of the counter-electrode assumes that the atoms of the metal vapour are electrically charged.

"Engel & Steenbeck, Elektrische Gasentladung, Springer 1932" states:

"As sufficiently high heated metals emit electrons in the surrounding, some individual metals also show an emission of positive ions, the ions consisting of single charged atoms of the heated metal. This emission of ions is observed mainly on Cr, Mo, W, Rh, Ta, whilst it does not occur with many other metals, such as Fe, Ni, Co, Cu, Au, Pt, Zr, Pd, Sb, the alkalies and the earth alkalies. In addition to the vaporization of the positive ions, there is a much stronger vaporization of the neutral atoms, so that, in the case of tungsten, only about each 2000 to 4000 vaporized atom flies off as ion."

This passage of literature, which gives the result of experimental investigation of the state of charge of different metals, obviously shows, that neither the metal vapor of each chemical element carries a charge, nor that the metal vapour of an element, which permits of producing positive ions, is quantitatively charged. To the metal vapour condensing by diffusion on the article, there is added, when use is made of a counter-electrode, only the comparatively small amount of charged metal vapour.

The invention hereinafter described, which considerably increases the economy of the vaporization of coating materials, relates to a method of coating articles by the vaporization of coating materials at sub-atmospheric pressure, and the characteristic feature thereof is, that the vaporized particles of material are charged and held together by a magnetic field, the material to be vaporized being connected in the form of a counter-electrode, preferably, however, as a cathode, with respect to an accelerating electrode. The magnetic field is so arranged, that the charged vaporized particles of material are collected and held together in the form of a beam.

Since, when use is made of a magnetic field, the charge is effected by the collection of electrons on the vaporized small particles of metal, it has been found especially advantageous to use additional sources of electrons, in order to increase the proportion of the small charged particles when necessary. For instance, when a melt is vaporized, electron emitting materials, such as, for instance, earth alkali oxides, -carbonates, -nitrates, thorium etc., may be added to the melt. It has been found advantageous to arrange the source of electrons, for instance, in the form of a ring around a crucible containing the material to be vaporized, and which is brought to such a temperature by heating, that electrons are emitted in sufficient number. The electrons originated from the melt and the additional sources of electrons are compelled, by the magnetic field produced by an annular coil, to increase their path to the accelerating electrode; in the case of the formation of the field by an annular coil, for instance, in the form of a helical path, the pitch of which can be increased by the intensity of the field. By this action the metal vapour is traversed intensively by the electrons which thus charge more vaporized particles. The vapour particles now charged are held together and directed under the action of the magnetic field of the annular coil.

In order to accelerate the charged metal vapour particles, an accelerating electrode is provided, which is preferably arranged in such a manner in the sub-atmospheric vessel, that the charged particles, which are held together, are not hindered in their direction of flight. It has been found advantageous to construct the accelerating electrode in the form of an annular electrode, so that the beam of particles can pass without hindrance through the opening of the annular electrode. The deflection of the metal vapour particles, which are thus held together and are not hindered in their freedom of movement, is attained by a suitable arrangement of magnetic fields. The magnetic fields are preferably arranged at right-angles to one another and transversely to the direction of flight. By varying the magnetic flux of these deflecting magnets, the particles can be so controlled that they run along a desired surface. If the metal vapour particles are to be led over a greater length on the article, it is advisable to impart to the vaporized, charged particles, which are held in a beam, an acceleration, which increases towards the article; in that case the article, when it is metallic, is connected additionally as an auxiliary electrode, or directly as an accelerating electrode, a voltage opposite to that of the particles being applied. In the case of non-metallic articles, a metallic electrode is arranged directly behind the same, which, as in the preceding case, is connected to the corresponding voltage. The accelerating or auxiliary electrodes are connected to a source of high voltage, in order to impart sufficient speed to the particles, which source may supply a continuous or an alternating current voltage, or a rectified alternating current voltage. An interruption of the continuous or alternating current voltage, or of the rectified alternating current voltage, has been found to have a favourable effect, one or more impulses being preferably so applied, that they fall in the period of rest of the heating of the materials to be vaporized.

The vaporization of the cathode material may be effected in various ways, for instance by pure resistance heating in a crucible, the material to be vaporized being caused to melt by means of a wire helix placed around the crucible and embedded therein, and being supplied with continuous or alternating current. The resistance heating by means of a wire helix placed around the crucible is suitable only for materials the melting point of which lies below about 1300° C. It has the advantage that the magnetic field, which is thereby formed, assists at the same time the charging and holding together of the vaporized particles, when the current in the helix has the same direction as that of the current in the field coil. By suitably dimensioning the field coil for holding together the particles, the heating winding of the crucible may advantageously be connected in series therewith. Instead of the resistance heating, use may advantageously be made of high frequency heating, which permits of obtaining substantially higher temperatures than in the case of the resistance heating. In order to vaporize materials melting at an especially high temperature, such as, for instance, tungsten, chromium, molybdenum, tantalum, titanium, and so on, electric arc heating is especially suitable. In that case, when the material to be vaporized is in the form of powder, the heating may be effected in the crucible by one or more electrodes projecting therein. By using sufficiently great continuous or alternating currents the electric arc can be well maintained at sub-atmospheric pressures. The starting of the arc is effected either by a short circuit, or by means of a high voltage, preferably, however, of high frequency. In all cases it is necessary that the material to be vaporized in the heating crucible is connected as a counter-electrode, preferably as a cathode, with respect to the accelerating, and also auxiliary accelerating electrode. When use is made of materials to be vaporized which are in a solid form, the electric arc used as a vaporizing source offers the most advantages, since the material can be brought very quickly in preferred positions to the vaporizing temperature.

The electric arc is operated, preferably intermittently, in order to avoid the dripping of the material between the electrodes to be vaporized, and prevent the magnetic field which effects the charging and the holding together from being disturbed by the field which is formed around the vaporizing electrodes. The magnetic field of the annular coil used for the charging and holding together of the metal vapour particles may, however, influence the electric arc unfavourably, according to the arrangement of the electrodes to be vaporized, for which reason it is an advantage to allow the annular coil to act during the interruption of the electric arc circuit. Since the heated electric arc electrodes, after the interruption of the arc circuit, no longer emit electrons to the same extent as previously, also in the case of this kind of vaporization, an additional source of electrons is of advantage. The same is so arranged, that the electric arc electrodes to be vaporized lie between it and the accelerating electrode or the article, in order to allow the produced vapour to be well penetrated by electrons. A further auxiliary means for the good vaporization of the material and which has been successfully used, also in the case of resistance and high frequency heating, consists in that the vaporization is effected at sub-atmospheric pressures, at which the filling gas is ionized. Since, in all cases, the material to be vaporized is connected as a counter-electrode to the accelerating electrode or article, the gas ions which are formed will impinge on the cathode material that has already been heated and, by giving up their energy, increase the vaporization or, if the cathode material has not yet reached the point of vaporization, so increase the temperature, that a vaporization takes place.

When the vaporization is effected by means of an electric arc between two solid electrodes, in order that the two electrodes shall be exposed uniformly to the ion bombardment during the period of rest of the heating, the voltage of the accelerating and also of the auxiliary electrode or of the article is applied to the electric centre of the same, by connecting a resistance in parallel with the electric arc system. As in the case of the electric arc vaporization between two solid electrodes, it is advantageous, also with the other kinds of vaporization, to effect the heating, not continuously, but provide heating rests in between. It has been found that the vaporized amount per unit of time, in the case of intermittent heating of the material to be vaporized, is greater than in the case of continuous heating. The accelerating voltage acts in that case advantageously in the rest periods of the heating and it may be a continuous or alternating current voltage. The best effect is obtained with a pulsating continuous current voltage, which is preferably inserted during the periods of rest of the heating. It may, for instance, consist of a number of alternations of a rectified alternating current of 50 or higher periods. If it is desired to obtain determined individual impulses during the time that the high voltage is connected up, then preferably only one alternation of the alternating current is rectified. However, also by using grid controlled valves the individual impulses of the voltage applied to the accelerating, or auxiliary electrodes, or the article, may be obtained.

The invention further relates to an apparatus for carrying into effect the method described, which apparatus consists of a vacuum vessel comprising a vaporization chamber, with a vaporizer capable of being heated, and associated with a device for the additional generation of electrons, a magnetic field, by means of which the vapour that is produced is charged, directed and collected into a beam, and electromagnets for controlling the beam; and of a treatment chamber in which the article to be coated is accommodated, as well as of a voltage lead to the auxiliary electrode or the article; a number of vaporizers being connected to the treatment chamber, if desired.

The invention also relates to a further apparatus for carrying into effect the method described, which apparatus consists: of a vacuum vessel with vaporizing electrodes arranged therein and connected to a source of continuous or alternating current for producing the electric arc between them; of a device for the additional generation of electrons; of a chamber for the article to be sprayed on; and of one or more field coils excited by a source of current for charging and collecting the particles vaporized from the electric arc electrodes; of a starting device for the electric arc; and of controllable switches in the electric arc circuit, starting circuit, field magnet circuit and high voltage circuit.

The invention also comprises mechanical switching means, such as controllers or electric switching means, such as relays, tube switches or the like, for the connection of the electric arc and high voltage circuit.

The invention is illustrated diagrammatically, and by way of example, in the accompanying drawings, in which.

Figure 1:
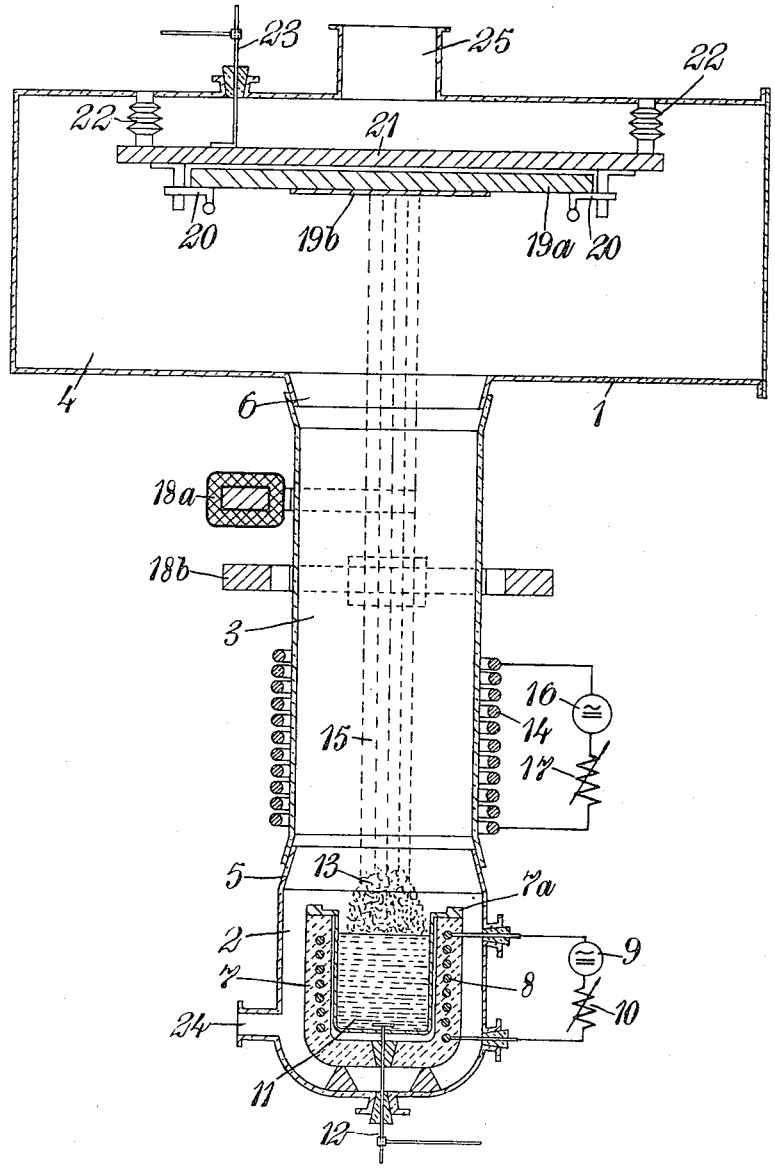
Figure 1 is a section through a whole plant for coating articles by means of thermal vaporization at subatmospheric pressure with resistance heating.

Referring to Figure 1, which illustrates a general plant for coating articles by means of thermal vaporization with resistance heating at subatmospheric pressure, 1 is the vacuum vessel which consists of two parts, a vaporizing chamber 3 with a removable vaporizer 2 and a treatment chamber 4, the parts being removably connected together by the ground surfaces 5 and 6.

In the vaporizer 2 there is provided the vaporizing vessel, for instance a crucible 7, which is heated by a resistance heating helix 8 supplied with current from a source of current 9 over a resistance 10. At the edge of the crucible there is provided the emitting material 7a for the additional electrons, the same being, for instance, arranged annularly. However, the crucible itself may consist of a material emitting electrons, such as, for instance, thorium oxide. 11 is the molten metal, which is connected by the lead 12 to a source of high voltage. The vapour 13, which ascends from the melt, is charged by means of a magnetic field produced by the field coil 14, being directed and held together in the form of a beam 15. The field coil is fed with current from a source of current 16 over a resistance 17. 18 and 18b are two electromagnets, the fields of which are preferably at right-angles to one another, and by means of which the vapour beam, that has been collected and held together, can be led over the surface of the article 19a arranged in the treatment chamber, to produce thereon the layer 19b. The article 19a is supported by means of fixing parts 20 on a metal plate 21 in a removable manner, the said metal plate being arranged by means of insulators 22 on the back wall of the treatment chamber. The metal plate 21 may be connected by means of a lead 23 to a source of voltage. 24 is a gas inlet pipe for the filling gas, which, according to the material to be atomized, may consist of hydrogen, nitrogen, helium, neon and so on. 25 is a connecting pipe leading to the vacuum pump.

Figure 2:
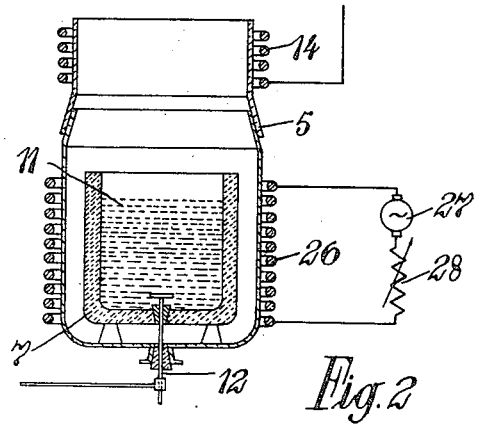
Figure 2 is a section through a vaporizer heated with high frequency.

Figure 2 is a section through a vaporizer heated with high frequency currents. The high frequency coil 26 is supplied with current from a source 27 of high frequency currents over an adjustable resistance 28. 12 is again a lead for connecting the high voltage on to the melt. 11 is the crucible and 4 the collecting field coil for the charging and holding together of the vapour in the form of a beam.

Figure 3:
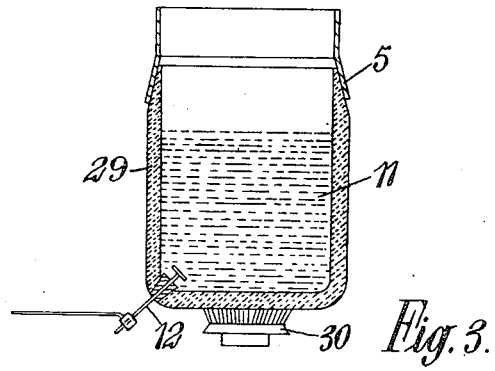
Figure 3 is a section through a vaporizer with gas heating.

Figure 3 is a section through a vaporizer 29, which is provided with gas heating 30. The chamber 29 forms at the same time the crucible, the outer wall of which is heated. 12 is a lead for the voltage.

Figure 4:
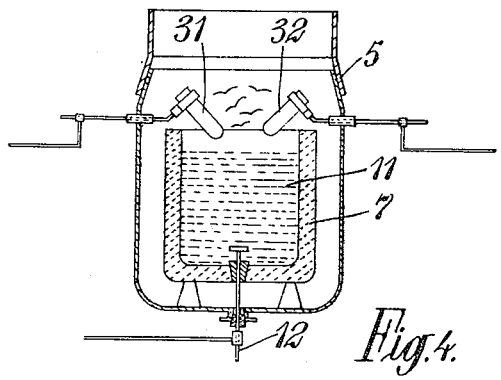
Figure 4 is a section through a vaporizer with electric arc heating.

Figure 4 shows a section through a vaporizer with electric arc heating, 31 and 32 are the two electrodes of the electric arc. 7 is the crucible containing the melt and 12 is a lead for the voltage. 11 is the melt.

Figure 5:
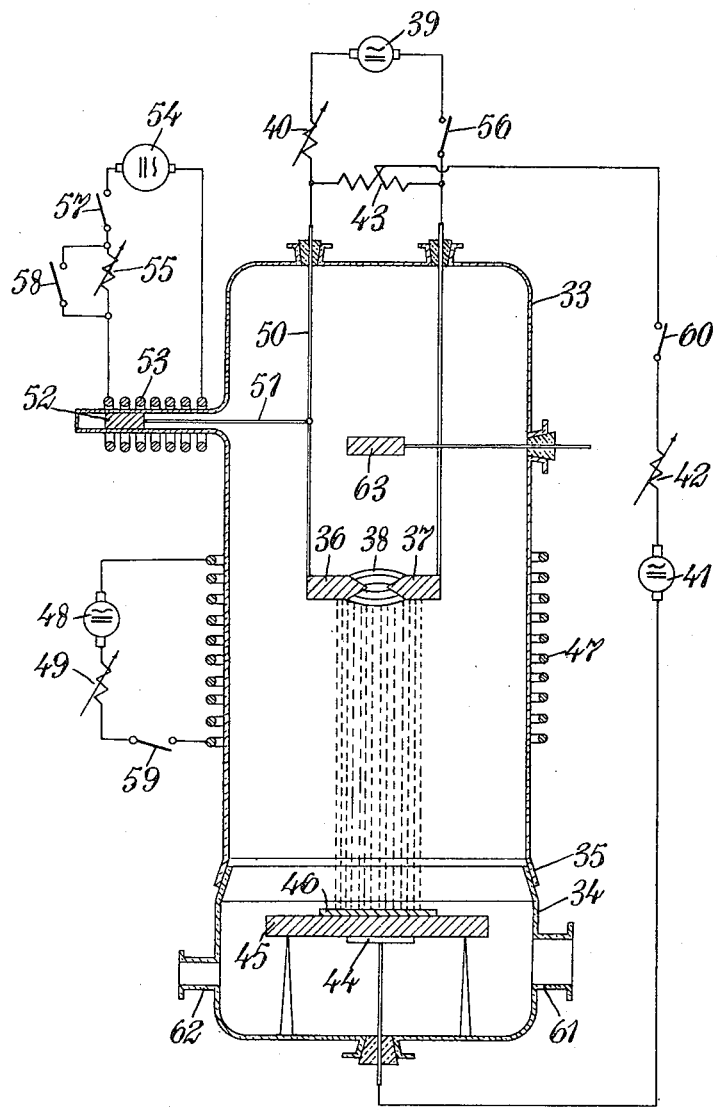
Figure 5 shows an electric arc vaporizing plant in which the electrodes constitute the material to be vaporized.

Figure 5 shows an electric arc vaporizing plant in which the electrodes form the material to be vaporized. The vaporizing apparatus consists of two parts, namely the vaporizing chamber 33 and the treatment chamber 34, which are connected together in a gas-tight manner by means of ground surfaces 35. 36 and 37 are the material to be vaporized, which constitutes the electrodes of an electric arc, provided with the required energy from the source of continuous or alternating current 39 over a resistance 40. Alternating current has the advantage, as compared with continuous current, that both electrodes are equally vaporized. 41 is a source of high voltage, which is connected over an adjustable resistance 42 to the electric centre of the electric arc system over the potentiometer 43, and the article 45 over the contact electrode 44, which, in the case of non-metallic articles, acts as an accelerating electrode. 46 represents the coating of vaporized material. 47 is a coil, which is excited from a source of current 48 over a resistance 49, and which produces a magnetic field for the charging and collection of the particles vaporized from the arc electrodes. The current lead 50 of the one electrode of the electric arc is connected to a rod 51, the end of which is provided with an iron piece 52, which can be moved through a coil 53 supplied with current from a source of continuous or alternating current 54 over an adjustable resistance 55. This control device serves for the starting of the arc. By opening and closing the circuit of the coil 53 an intermittent vaporization of the electrode material is obtained. Further, the current lead 50 to the one electrode may be made from a bimetal strip, which, when heated by the current causes the electrode 36, after the starting of the arc, to be automatically removed from the other electrode 37, thereby interrupting the current of the arc.

In the circuit of the electric arc there is provided a switch 56, and in the starting circuit, a switch 57 and a short circuit switch 58, which allows of wholly or partly short-circuiting the resistance 55 in the starting circuit. The field magnet circuit includes a switch 59 and the high voltage circuit a switch 60. According to the invention these switches may be closed and opened in a definite rhythm.

The actuation of the switches 56, 57, 58, 59, 75

60, is preferably effected by means of a mechanical switching device, for instance, by means of a controller driven by a motor. Instead of the switches 56, 57, 58, 59, 60 use may be made of electric switching means, such as relays, switching tubes and the like.

The connecting pipe 61 leads to the vacuum pump, and through the pipe 62 a gas, for instance hydrogen, nitrogen, helium or the like, may be supplied. The degree of vacuum and the high voltage depend entirely on the kind of electrode material to be vaporized, and whether the vaporization has to take place by additional ion bombardment. The electrodes to be vaporized may consist of any desired metals or alloys, or also of non-metals, for instance, one electrode may consist of carbon and the other electrode of metal. 63 is the additional source of electrons.

What we claim is:

1. A method of coating articles by the vaporization of a coating material at sub-atmospheric pressure, consisting in first fusing the coating material and then vaporizing it at sub-atmospheric pressure connected up as a counter-electrode with respect to an accelerating electrode and, simultaneously therewith, charging the particles of vaporized material and concentrating them in the form of a beam proceeding from the fused material towards the surface to be coated by a magnetic field produced above the fused material independently of the fusing of the material and extending towards the surface to be coated.

2. A method as claimed in claim 1, in which the material to be vaporized is connected up as a cathode and the article to be coated as an anode.

3. A method as claimed in claim 1, in which the magnetic field is produced by an annular coil.

4. A method as claimed in claim 1, consisting in increasing the amount of the charged vaporized particles by additional sources of electrons.

5. A method as claimed in claim 1, in which the beam of charged particles of vaporized material concentrated by the magnetic field is caused to pass the accelerating electrode, without the latter hindering the direction of flight of the said particle.

6. A method as claimed in claim 1, in which the material to be vaporized is connected up as a cathode and the article to be coated as an anode, and the vaporization is effected by intermittently heating the fused cathode material.

7. A method as claimed in claim 1, in which the charged particles of vaporized material concentrated in a beam by the magnetic field are deflected by additional magnetic fields for the purpose of causing the beam of charged particles to traverse the surface to be coated.

WILHELM BURKHARDT.
RUDOLF REINECKE.